（12）United States Patent
Butcher et al.

(10) Patent No.: US 9,891,678 B2
(45) Date of Patent: *Feb. 13, 2018

(54) SYSTEMS AND METHODS FOR REMOTELY RESETTING MANAGEMENT CONTROLLER VIA POWER OVER ETHERNET SWITCH

(71) Applicant: Dell Products L.P., Round Rock, TX (US)

(72) Inventors: Wade Andrew Butcher, Cedar Park, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/931,496

(22) Filed: Nov. 3, 2015

(65) Prior Publication Data

US 2017/0123468 A1 May 4, 2017

(51) Int. Cl.
*G06F 1/00* (2006.01)
*G06F 1/24* (2006.01)
*G06F 1/26* (2006.01)

(52) U.S. Cl.
CPC .............. *G06F 1/24* (2013.01); *G06F 1/266* (2013.01)

(58) Field of Classification Search
CPC ... G06F 1/24; G06F 1/266; G06F 1/26; G06F 9/4416; H04L 41/0654; H05L 41/0803

USPC .............................. 713/330, 1; 709/220, 223
See application file for complete search history.

(56) References Cited

U.S. PATENT DOCUMENTS

| 2005/0086460 A1* | 4/2005 | Huang | G06F 1/24 713/2 |
| 2008/0046706 A1* | 2/2008 | Hirai | G06F 11/2294 713/1 |
| 2014/0052309 A1* | 2/2014 | Chandrasekhar | G06F 1/26 700/297 |
| 2014/0115354 A1* | 4/2014 | Jabbaz | G06F 1/266 713/310 |
| 2016/0198367 A1* | 7/2016 | Nerella | H04W 76/023 370/254 |
| 2016/0266637 A1 | 9/2016 | Butcher et al. | |

* cited by examiner

*Primary Examiner* — Nitin Patel
(74) *Attorney, Agent, or Firm* — Jackson Walker L.L.P.

(57) ABSTRACT

In accordance with embodiments of the present disclosure, an information handling system may include a processor, a management controller communicatively coupled to the processor and configured to provide out-of-band management of the information handling system, and one or more logic devices. The one or more logic devices may be configured to monitor a power-over-Ethernet input of a network interface communicatively coupled to the one or more logic devices in order to detect an indication at the power-over-Ethernet input of a request to remotely reset the management controller and, responsive to determining presence of the indication at the power-over-Ethernet input of the request to remotely reset the management controller, cause a reset of the management controller.

21 Claims, 3 Drawing Sheets

SYSTEMS AND METHODS FOR REMOTELY RESETTING MANAGEMENT CONTROLLER VIA POWER OVER ETHERNET SWITCH

TECHNICAL FIELD

The present disclosure relates in general to information handling systems, and more particularly to methods and systems for remote reset of a management controller of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a management controller for providing out-of-band management facilities for management of the information handling system. Such management may be made by the management controller even if the information handling system is powered off or powered to a standby state, as a management controller may include an out-of-band network interface separate from and physically isolated from an in-band network interface of the information handling system. Such management controllers may include or may be an integral part of a baseboard management controller (BMC), a remote access controller (e.g., a Dell Remote Access Controller of Integrated Dell Remote Access Controller), an enclosure controller, or a chassis management controller (CMC).

On some occasions, the management controller, which may effectively be a "system-on-a-chip" running a set of applications upon a special purpose operating system of the management controller, may experience a lock-up or similar failure requiring reset of the management controller. Typically approaches to performing such reset, such as a manual powering off and powering on of the management controller by an individual physically present at the information handling system, are often undesirable.

SUMMARY

In accordance with the teachings of the present disclosure, the disadvantages and problems associated with existing approaches to resetting a management controller of an information handling system may be reduced or eliminated.

In accordance with embodiments of the present disclosure, an information handling system may include a processor, a management controller communicatively coupled to the processor and configured to provide out-of-band management of the information handling system, and one or more logic devices. The one or more logic devices may be configured to monitor a power-over-Ethernet input of a network interface communicatively coupled to the one or more logic devices in order to detect an indication at the power-over-Ethernet input of a request to remotely reset the management controller and, responsive to determining presence of the indication at the power-over-Ethernet input of the request to remotely reset the management controller, cause a reset of the management controller.

In accordance with these and other embodiments of the present disclosure, a method may include in an information handling system comprising a management controller communicatively coupled to a processor of the information handling system and configured to provide management of the information handling system via a communications channel physically isolated from a network interface communicatively coupled to the processor, monitoring a power-over-Ethernet input of a network interface communicatively coupled to one or more logic devices in order to detect an indication at the power-over-Ethernet input of a request to remotely reset the management controller. The method may also include causing a reset of the management controller responsive to determining presence of the indication at the power-over-Ethernet input of the request to remotely reset the management controller.

In accordance with these and other embodiments of the present disclosure, one or more logic devices may be configured to, when disposed in an information handling system comprising a management controller communicatively coupled to a processor of the information handling system and configured to provide management of the information handling system via a communications channel physically isolated from a network interface communicatively coupled to the processor, monitor a power-over-Ethernet input of a network interface communicatively coupled to the one or more logic devices in order to detect an indication at the power-over-Ethernet of a request to remotely reset the management controller. The one or more logic devices may also be configured to cause a reset of the management controller responsive to determining presence of the indication at the power-over-Ethernet of the request to remotely reset the management controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
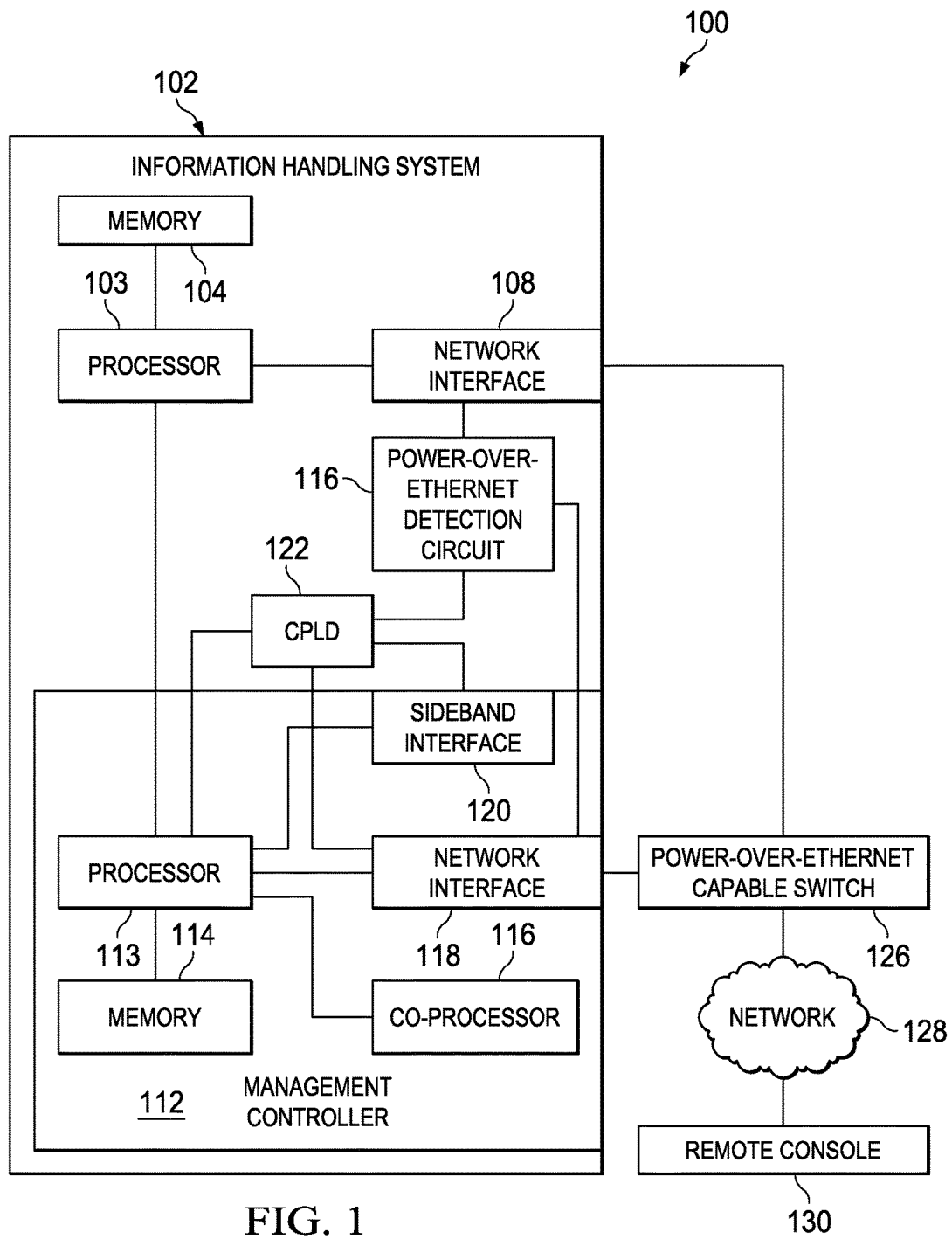
FIG. 1 illustrates a block diagram of an example system for remotely resetting a management controller, in accordance with embodiments of the present disclosure.
Figure 2:
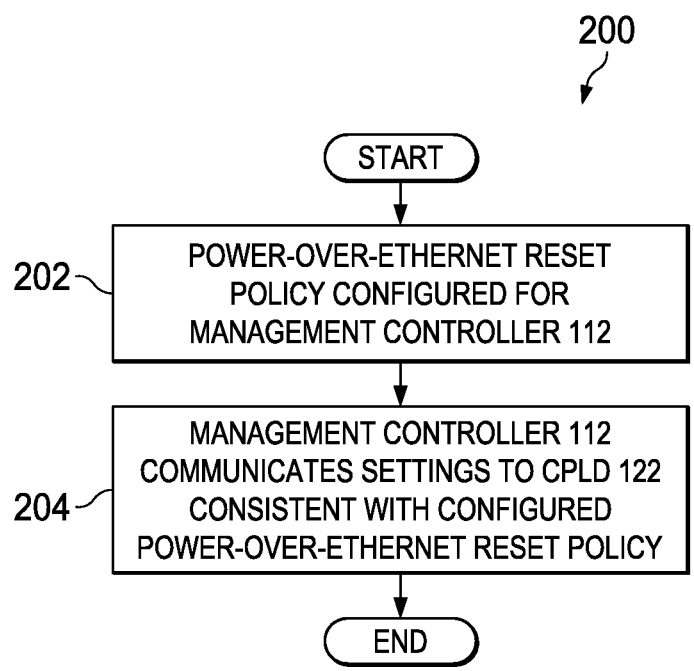
FIG. 2 illustrates a flow chart of an example method for provisioning an information handling system for remote reset of a management controller, in accordance with embodiments of the present disclosure.
Figure 3:
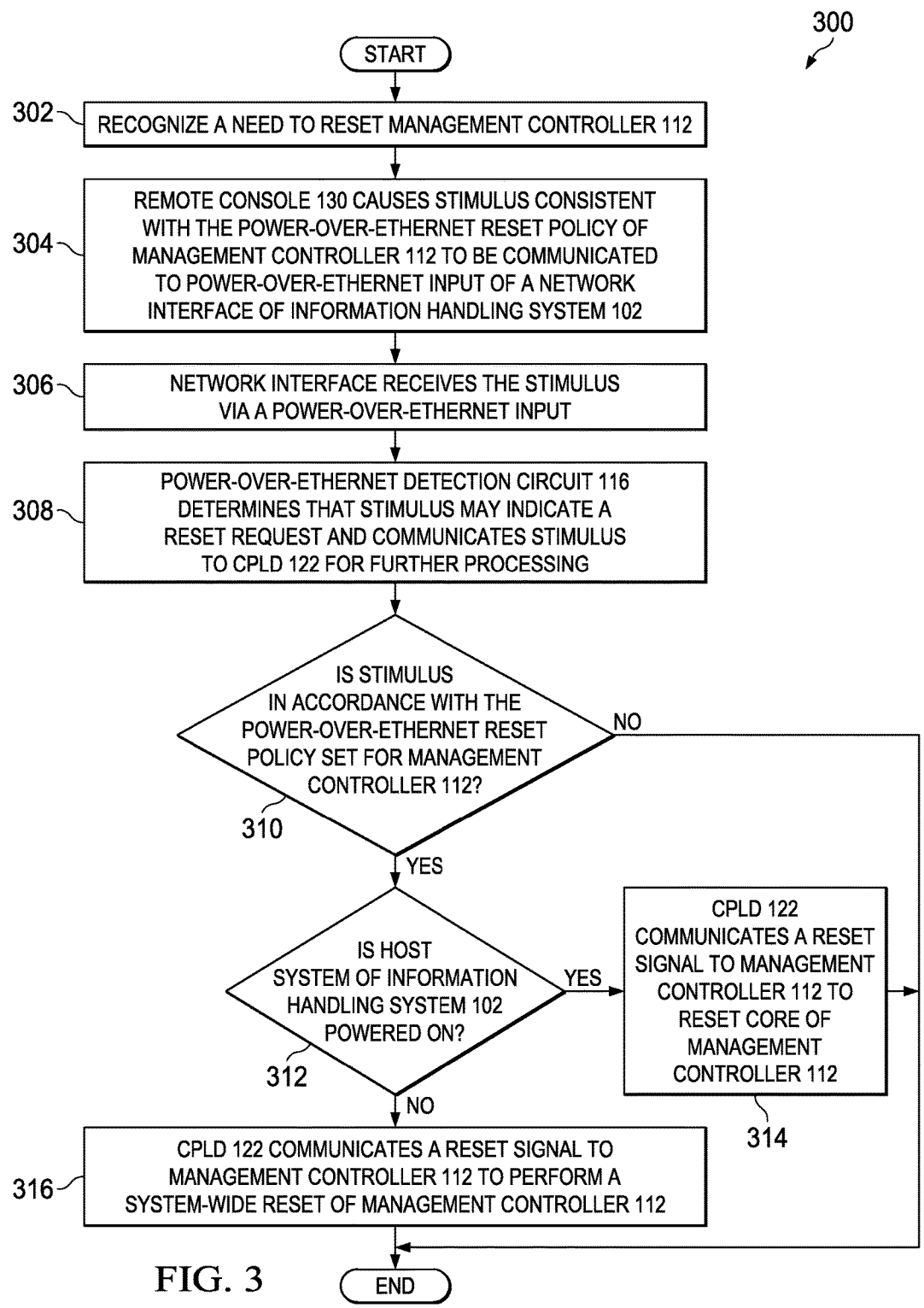
FIG. 3 illustrates a flow chart of an example method for remote reset of a management controller, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 for remotely resetting a management controller 112, in accordance with embodiments of the present disclosure. As shown in FIG. 1, system 100 may include an information handling system 102, a power-over-Ethernet capable switch 126, a network 128, and a remote console 130.

In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a network interface 108 communicatively coupled to processor 103, a management controller 112 communicatively coupled to processor 103, a power-over-Ethernet detection circuit 116, and a complex programmable logic device (CPLD) 122 communicatively coupled to management processor 113.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Network interface 108 may comprise any suitable system, apparatus, or device operable to serve as an interface between information handling system 102 and one or more other information handling systems (e.g., via power-over-Ethernet capable switch 126 and network 128). Network interface 108 may enable information handling system 102 to communicate using any suitable transmission protocol and/or standard. In these and other embodiments, network interface 108 may comprise a network interface card, or "NIC."

Management controller 112 may be configured to provide out-of-band management facilities for management of information handling system 102. Such management may be made by management controller 112 even if information handling system 102 is powered off or powered to a standby state. Management controller 112 may include a processor 113, memory 114, an out-of-band network interface 118 separate from and physically isolated from in-band network interface 108, and a sideband interface 120. In certain embodiments, management controller 112 may include or may be an integral part of a baseboard management controller (BMC), a remote access controller (e.g., a Dell Remote Access Controller of Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off.

Network interface 118 may comprise any suitable system, apparatus, or device operable to serve as an interface between management controller 112 and one or more other information handling systems (e.g., via power-over-Ethernet capable switch 126 and network 128). Network interface 118 may enable management controller 112 to communicate using any suitable transmission protocol and/or standard. In these and other embodiments, network interface 118 may comprise a network interface card, or "NIC."

Sideband interface 120 may comprise an interface of management controller 112 which is separate from and physically isolated from network interface 118, and which is configured to receive data from and/or communicate data to a CPLD 122 of information handling system 102.

Power-over-Ethernet detection circuit 116 may comprise any suitable system, device, or apparatus for monitoring a power-over-Ethernet input of one or more of network interfaces 108 and 118 and detecting a voltage level or other electrical parameter of a power-over-Ethernet voltage at either of network interfaces 108 and 118 indicative of a signal for resetting management controller 112. For example, power-over-Ethernet detection circuit 116 may detect whether such voltage received at a power-over-Ethernet input at either of network interfaces 108 and 118 is above or below a threshold voltage programmed (e.g., by CPLD 122) within power-over-Ethernet detection circuit 116. If the voltage triggers such programmable threshold voltage, it may indicate a power-over-Ethernet reset event initiated by remote console 130, and accordingly power-over-Ethernet detection circuit 116 may communicate an indication of such triggering to CPLD 122 and/or communicate a signal present on such power-over-Ethernet input to CPLD 122 for further processing.

CPLD 122 or another processing device may be coupled to management controller 112 and/or other components of information handling system 102. In some embodiments, CPLD 122 may be configured to perform functionality relating to remote reset operations for management controller 112, as described elsewhere herein. For example, CPLD 122 may program one or more threshold voltages for power-over-Ethernet detection circuit 116, such that power-over-Ethernet detection circuit 116 may determine whether a remote reset signal has been communicated by remote console 130 over a power-over-Ethernet input. As another example, CPLD 122 may receive from power-over-Ethernet detection circuit 116 indications that one or more such thresholds have been triggered, receive from power-over-Ethernet detection circuit 116 a signal present on such power-over-Ethernet input, and/or process any such signal to manage a reset of management controller 112.

In addition to processor 103, memory 104, network interface 108, management controller 112, power-over-Ethernet detection circuit 116, and CPLD 122, information handling system 102 may include one or more other information handling resources.

Power-over-Ethernet capable switch 126 may be any suitable system, device, or apparatus for communicating data to a network interface coupled (e.g., via a cable) to a port of power-over-Ethernet switch 126 and also providing electrical power via one or more wires of such cable to coupled devices that support such functionality. Power-over-Ethernet may describe any of several standardized or ad-hoc systems which pass electrical power along with data on Ethernet cabling, thus allowing a single cable to provide both data connection and electrical power to devices supporting power over Ethernet. Power may be carried on the same conductors as the data, or it may be carried on dedicated conductors in the same cable. Power-over-Ethernet may be implemented via IEEE standard 802.3 or in any other suitable manner. In embodiments in which power is transmitted on wires for communicating data, such power may be transmitted by power-over-Ethernet switch 126 by applying a common-mode voltage to a differential signaling pair of an Ethernet cable. Because twisted-pair Ethernet uses differential signaling, such common-mode voltage does not interfere with data transmission. Such common mode voltage may be extracted (e.g., by power-over-Ethernet detection circuit 116) using the center tap of the standard Ethernet pulse transformer.

As used herein, the term "power-over-Ethernet input" may refer to a component of a network interface (e.g., one or more input pins) configured to receive the power-over-Ethernet voltage transmitted by power-over-Ethernet switch 126.

Network 128 may be a network and/or fabric configured to couple information handling system 102, remote console 130, and/or one or more other information handling systems to one another. In these and other embodiments, network 128 may include a communication infrastructure, which provides physical connections, and a management layer, which organizes the physical connections and information handling systems communicatively coupled to network 128. Network 128 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 128 may transmit data via wireless transmissions and/or wireline transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 128 and its various components may be implemented using hardware, software, or any combination thereof.

Remote console 130 may comprise any information handling system including requisite hardware, software, and/or firmware for interfacing with management controller 112 via network interface 118 in order to facilitate remote management of information handling system 102 by remote console 130. In some embodiments, such remote management may be in accordance with Intelligent Platform Management Interface (IPMI) and/or another suitable interface or standard.

FIG. 2 illustrates a flow chart of an example method 200 for provisioning an information handling system 102 for remote reset of management controller 112, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, an administrator (e.g., local to information handling system 102 or via remote console 130) may configure a power-over-Ethernet reset policy for management controller 112. For example, such power-over-Ethernet reset policy may include whether or not reset via power-over-Ethernet is enabled or disabled for management controller 112. As another example, such power-over-Ethernet reset policy may include a signaling method of an indication of power-over-Ethernet enabled reset. One signaling method may be used for an information handling system 102 that is not drawing power via a power-over-Ethernet input, in which a pattern of pulses between a minimum voltage (e.g., zero volts) and a maximum voltage (e.g., five volts) may be used to convey a power-over-Ethernet. Another signaling method may be used for an information handling system 102 that is drawing power via a power-over-Ethernet input, in which a signal (e.g., pulses between a minimum and maximum voltage) may be superimposed onto the voltage (e.g., a common-mode voltage on a differential pair) for providing the power. As a further example, a power-over-Ethernet reset policy may include a signal pattern for indicating a reset request. In other words, the policy may define a pattern or signature of pulses that, for a particular management controller 112, indicates that remote console 130 has communicated a request to reset management controller 112.

At step 204, after a power-over-Ethernet reset policy has been configured at management controller 112, management controller 112 may communicate settings to CPLD 122 consistent with the configured power-over-Ethernet reset policy. Accordingly, CPLD 122 may be programmed to determine when voltages received on a power-over-Ethernet input indicate a reset request from remote console 120. In some embodiments, CPLD 122 may further program power-over-Ethernet detection circuit 116 with one or more programmable thresholds, such that CPLD 122 only processes voltages present on the power-over-Ethernet input that cross such one or more programmable thresholds. For example, if power-over-Ethernet input has a common-mode voltage, programmable thresholds may cause power-over-Ethernet detection circuit 116 to communicate information to CPLD 122 for processing when a voltage of the power-over-Ethernet input deviates a minimum amount from such common-mode voltage. After completion of step 204, method 200 may end.

Method 200 may be implemented using system 100 or any other system operable to implement method 200. In certain embodiments, method 200 may be implemented partially or fully in software and/or firmware embodied in computer-readable media.

FIG. 3 illustrates a flow chart of an example method 300 for remote reset of management controller 112, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, a remote console 130 or a user at remote console 130 may recognize a need to reset management controller 112. For example, in some embodiments, remote console 130 may automatically detect that a management controller 112 has been unresponsive for a period of time in response to a timeout or other indication.

At step 304, remote console 130 may cause a stimulus consistent with the power-over-Ethernet reset policy of management controller 112 to be communicated to a power-over-Ethernet input of a network interface 108 or 118 of information handling system 102. The stimulus may comprise a signal pattern (e.g., pattern or signature of pulses) set for management controller 112 at step 202 of method 200 above.

At step 306, a network interface 108 or 118 may receive the stimulus via a power-over-Ethernet input. At step 308, power-over-Ethernet detection circuit 116 may determine that the stimulus may indicate a reset request, and communicate the stimulus (or other signals indicative of the stimulus) to CPLD 122 for further processing.

At step 310, CPLD 122 may determine whether the stimulus is in accordance with the power-over-Ethernet reset policy set for management controller 112. If the stimulus is in accordance with the power-over-Ethernet reset policy set for management controller 112, method 300 may proceed to step 312. Otherwise, method 300 may end.

At step 312, CPLD 122 may determine whether a host system (e.g., processor 103) of information handling system 102 is powered on. If powered on, method 300 may proceed to step 314. Otherwise, if the host system if powered off, method 300 may proceed to step 316.

At step 314, in response to the host system being powered on, CPLD 122 may communicate a reset signal to management controller 112 to reset a core (e.g., processor 113) of management controller 112. After completion of step 314, method 300 may end.

At step 316, in response to the host system being powered off, CPLD 122 may communicate a reset signal to management controller 112 to perform a system-wide reset of management controller 112. After completion of step 316, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using system 100 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
    a processor;
    a management controller communicatively coupled to the processor and configured to provide out-of-band management of the information handling system; and
    one or more logic devices configured to:
        monitor a power-over-Ethernet input of a network interface communicatively coupled to the one or more logic devices in order to detect an indication at the power-over-Ethernet input of a request to remotely reset the management controller, wherein the indication includes power-over-Ethernet being enabled and disabled; and
        responsive to determining presence of the indication at the power-over-Ethernet input of the request to remotely reset the management controller, cause a reset of the management controller;
    wherein the information handling system is not configured to be powered via the power-over-Ethernet input.

2. The information handling system of claim 1, wherein the one or more logic devices are further configured to apply a policy to determine whether the indication is present.

3. The information handling system of claim 2, wherein the policy includes whether the indication comprises a signal superimposed on a voltage of the power-over-Ethernet input.

4. The information handling system of claim 2, wherein the policy defines a signal pattern for indicating that the indication is indicative of a request to remotely reset the management controller, the signal pattern including power-over-Ethernet being enabled and disabled a plurality of times.

5. The information handling system of claim 1, wherein the one or more logic devices are further configured to determine whether a host system of the information handling system is powered on.

6. The information handling system of claim 5, wherein the one or more logic devices are further configured to cause a reset of a core of the management controller responsive to determining that the host system of the information handling system is powered on.

7. The information handling system of claim 5, wherein the one or more logic devices are further configured to cause a system-wide reset of the management controller responsive to determining that the host system of the information handling system is powered off.

8. A method comprising, in an information handling system comprising a management controller communicatively coupled to a processor of the information handling system and configured to provide management of the information handling system via a communications channel physically isolated from a network interface communicatively coupled to the processor:
    monitoring a power-over-Ethernet input of a network interface communicatively coupled to one or more logic devices in order to detect an indication at the power-over-Ethernet input of a request to remotely reset the management controller, wherein the indication includes power-over-Ethernet being enabled and disabled; and
    responsive to determining presence of the indication at the power-over-Ethernet input of the request to remotely reset the management controller, causing a reset of the management controller;
    wherein the information handling system is not configured to be powered via the power-over-Ethernet input.

9. The method of claim 8, further comprising applying a policy to determine whether the indication is present.

10. The method of claim 9, wherein the policy includes whether the indication comprises a signal superimposed on a voltage of the power-over-Ethernet input.

11. The method of claim 9, wherein the policy defines a signal pattern for indicating that the indication is indicative of a request to remotely reset the management controller.

12. The method of claim 8, further comprising determining whether a host system of the information handling system is powered on.

13. The method of claim 12, further comprising causing a reset of a core of the management controller responsive to determining that the host system of the information handling system is powered on.

14. The method of claim 12, further comprising causing a system-wide reset of the management controller responsive to determining that the host system of the information handling system is powered off.

15. One or more logic devices configured to, when disposed in an information handling system comprising a management controller communicatively coupled to a processor of the information handling system and configured to provide management of the information handling system via a communications channel physically isolated from a network interface communicatively coupled to the processor:
    monitor a power-over-Ethernet input of a network interface communicatively coupled to the one or more logic devices in order to detect an indication at the power-over-Ethernet input of a request to remotely reset the management controller, wherein the indication includes power-over-Ethernet being enabled and disabled; and
    responsive to determining presence of the indication at the power-over-Ethernet input of the request to remotely reset the management controller, cause a reset of the management controller;
    wherein the information handling system is not configured to be powered via the power-over-Ethernet input.

16. The one or more logic devices of claim 15, further configured to apply a policy to determine whether the indication is present.

17. The one or more logic devices of claim 16, wherein the policy includes whether the indication comprises a signal superimposed on a voltage of the power-over-Ethernet input.

18. The one or more logic devices of claim 16, wherein the policy defines a signal pattern for indicating that the indication is indicative of a request to remotely reset the management controller.

19. The one or more logic devices of claim 15, further configured to determine whether a host system of the information handling system is powered on.

20. The one or more logic devices of claim 19, further configured to cause a reset of a core of the management controller responsive to determining that the host system of the information handling system is powered on.

21. The one or more logic devices of claim 19, further configured to cause a system-wide reset of the management controller responsive to determining that the host system of the information handling system is powered off.

\* \* \* \* \*